(12) United States Patent
Takeda et al.

(10) Patent No.: US 11,743,886 B2
(45) Date of Patent: Aug. 29, 2023

(54) DOWNLINK (DL) HYBRID AUTOMATIC REQUEST (HARQ) TIMING AND UPLINK SHARED CHANNEL SCHEDULING TIMING

(71) Applicant: QUALCOMM Incorporated, San Diego, CA (US)

(72) Inventors: Kazuki Takeda, Tokyo (JP); Seyedkianoush Hosseini, San Diego, CA (US); Wanshi Chen, San Diego, CA (US); Peter Gaal, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 163 days.

(21) Appl. No.: 16/985,746

(22) Filed: Aug. 5, 2020

(65) Prior Publication Data

US 2021/0051689 A1 Feb. 18, 2021

Related U.S. Application Data

(60) Provisional application No. 62/888,012, filed on Aug. 16, 2019.

(51) Int. Cl.
*H04W 72/12* (2023.01)
*H04L 5/00* (2006.01)
(Continued)

(52) U.S. Cl.
CPC ....... *H04W 72/1268* (2013.01); *H04L 5/0007* (2013.01); *H04L 5/0044* (2013.01);
(Continued)

(58) Field of Classification Search
None
See application file for complete search history.

(56) References Cited

U.S. PATENT DOCUMENTS

2015/0016310 A1 1/2015 Yi et al.
2015/0043391 A1* 2/2015 Yin .................. H04L 1/1854
370/280
(Continued)

FOREIGN PATENT DOCUMENTS

EP 3209082 A1 * 8/2017 .............. H04J 11/00
EP 3209082 A1 8/2017

OTHER PUBLICATIONS

CATT, "Remaining details on HARQ-ACK on PUSCH", Mar. 31-Apr. 4, 2014, 3GPP TSG RAN WG1 Meeting #76bis R1-141177, pp. 1-2 (Year: 2014).*
(Continued)

*Primary Examiner* — Steve R Young
(74) *Attorney, Agent, or Firm* — Patterson + Sheridan, L.L.P.

(57) ABSTRACT

Certain aspects provide a method for wireless communication by a user-equipment (UE). The method generally includes receiving first downlink (DL) control information (DCI) for scheduling resources in time in a system frame for transmission of one or more uplink (UL) data channels and hybrid automatic request (HARQ) signaling for acknowledging whether one or more downlink data channels have been successfully decoded, the one or more UL data channels and the HARQ signaling being configured based on a UL to DL resource ratio associated with a time-division duplex (TDD) subframe configuration. In certain aspects, the UE generates the one or more UL data channels and the HARQ signaling, and transmits the UL data channels and the HARQ signaling using the scheduled resources and in accordance with the TDD subframe configuration.

28 Claims, 10 Drawing Sheets

(51) Int. Cl.
*H04L 5/14* (2006.01)
*H04W 72/1268* (2023.01)
*H04W 72/23* (2023.01)

(52) U.S. Cl.
CPC .......... *H04L 5/0055* (2013.01); *H04L 5/0094* (2013.01); *H04L 5/1469* (2013.01); *H04W 72/23* (2023.01)

(56) References Cited

U.S. PATENT DOCUMENTS

| 2016/0044638 | A1* | 2/2016 | Gao | H04L 5/0053 370/280 |
| 2016/0100422 | A1* | 4/2016 | Papasakellariou | H04L 1/1822 370/329 |
| 2016/0374082 | A1* | 12/2016 | Nguyen | H04L 1/1887 |
| 2017/0215172 | A1* | 7/2017 | Yang | H04W 52/146 |
| 2018/0115965 | A1* | 4/2018 | Takeda | H04L 5/0037 |

OTHER PUBLICATIONS

CATT: "Remaining Details on HARQ-ACK on PUSCH", 3GPP Draft; R1-141177, 3rd Generation Partnership Project (3GPP), Mobile Competence Centre ; 650, Route Des Lucioles ; F-06921 Sophia-Antipolis Cedex; France, vol. RAN WG1, No. Shenzhen, China; Mar. 31, 2014-Apr. 4, 2014, Mar. 22, 2014 (Mar. 22, 2014), pp. 1-2, XP050813676, Retrieved from the Internet: URL: http://www.3gpp.org/ftp/tsg_ran/WG1_RL1/TSGR1_76b/Docs/ [retrieved on Mar. 22, 2014].
International Search Report and Written Opinion—PCT/US2020/045229—ISA/EPO—dated Nov. 19, 2020.

* cited by examiner

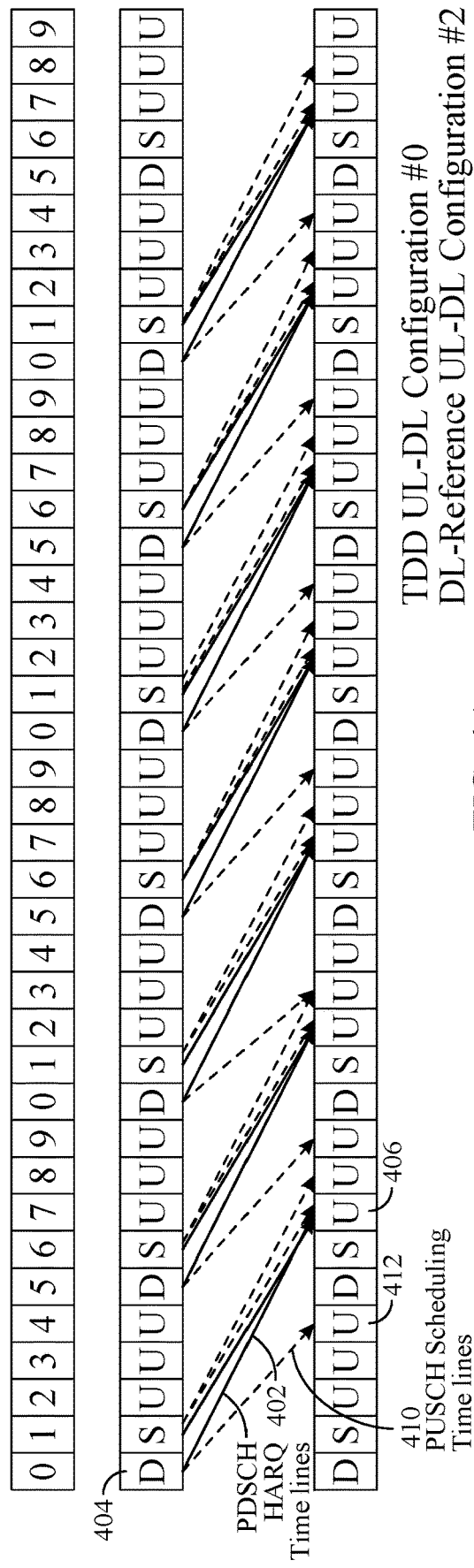
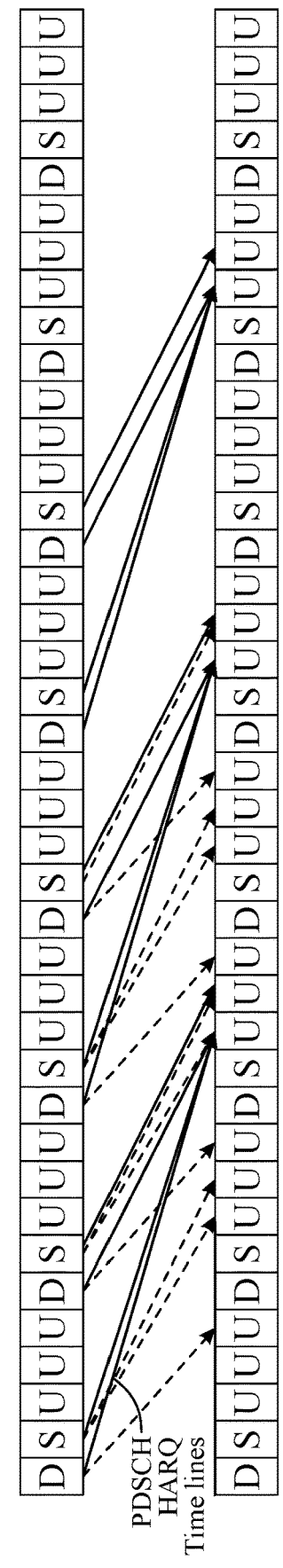
FIG. 4A
FIG. 4B

DOWNLINK (DL) HYBRID AUTOMATIC REQUEST (HARQ) TIMING AND UPLINK SHARED CHANNEL SCHEDULING TIMING

CROSS-REFERENCE TO RELATED APPLICATIONS

This application claims priority to provisional application 62/888,012, filed Aug. 16, 2019, which is assigned to the assignee hereof and hereby expressly incorporated by reference herein in its entirety as if fully set forth below and for all applicable purposes.

BACKGROUND

Field of the Disclosure

Aspects of the present disclosure relate to wireless communications, and more particularly, to techniques for subframe scheduling.

Description of Related Art

Wireless communication systems are widely deployed to provide various telecommunication services such as telephony, video, data, messaging, broadcasts, etc. These wireless communication systems may employ multiple-access technologies capable of supporting communication with multiple users by sharing available system resources (e.g., bandwidth, transmit power, etc.). Examples of such multiple-access systems include 3rd Generation Partnership Project (3GPP) Long Term Evolution (LTE) systems, LTE Advanced (LTE-A) systems, code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems, to name a few.

These multiple access technologies have been adopted in various telecommunication standards to provide a common protocol that enables different wireless devices to communicate on a municipal, national, regional, and even global level. New radio (e.g., 5G NR) is an example of an emerging telecommunication standard. NR is a set of enhancements to the LTE mobile standard promulgated by 3GPP. NR is designed to better support mobile broadband Internet access by improving spectral efficiency, lowering costs, improving services, making use of new spectrum, and better integrating with other open standards using OFDMA with a cyclic prefix (CP) on the downlink (DL) and on the uplink (UL). To these ends, NR supports beamforming, multiple-input multiple-output (MIMO) antenna technology, and carrier aggregation.

However, as the demand for mobile broadband access continues to increase, there exists a need for further improvements in NR and LTE technology. Preferably, these improvements should be applicable to other multi-access technologies and the telecommunication standards that employ these technologies.

SUMMARY

The systems, methods, and devices of the disclosure each have several aspects, no single one of which is solely responsible for its desirable attributes. Without limiting the scope of this disclosure as expressed by the claims which follow, some features will now be discussed briefly.

Certain aspects provide a method for wireless communication by a user-equipment (UE). The method generally includes: receiving first downlink (DL) control information (DCI) for scheduling resources in time in a system frame for transmission of one or more uplink (UL) data channels and hybrid automatic request (HARQ) signaling for acknowledging whether one or more downlink data channels have been successfully decoded, the one or more UL data channels and the HARQ signaling being configured based on a UL to DL resource ratio associated with a time-division duplex (TDD) subframe configuration; generating the one or more UL data channels and the HARQ signaling; and transmitting the one or more UL data channels and the HARQ signaling using the scheduled resources and in accordance with the TDD subframe configuration.

Certain aspects provide a method for wireless communication by a base station. The method generally includes: generating first DL DCI for scheduling resources in time in a system frame for transmission of one or more UL data channels and HARQ signaling for acknowledging whether one or more downlink data channels have been successfully decoded, the one or more UL data channels and the HARQ signaling being configured based on a UL to DL resource ratio associated with a TDD subframe configuration; transmitting the DCI to a UE; and receiving the one or more UL data channels and the HARQ signaling using the scheduled resources and in accordance with the TDD subframe configuration.

Certain aspects provide an apparatus for wireless communication by a UE. The apparatus generally includes a memory, and one or more processors coupled to the memory, the one or more processors and the memory being configured to: receive first DCI for scheduling resources in time in a system frame for transmission of one or more UL data channels and HARQ signaling for acknowledging whether one or more downlink data channels have been successfully decoded, the one or more UL data channels and the HARQ signaling being configured based on a UL to DL resource ratio associated with a TDD subframe configuration; generate the one or more UL data channels and the HARQ signaling; and transmit the one or more UL data channels and the HARQ signaling using the scheduled resources and in accordance with the TDD subframe configuration.

Certain aspects provide an apparatus for wireless communication by a base station. The apparatus generally includes a memory, and one or more processors coupled to the memory, the one or more processors and the memory being configured to: generate first DCI for scheduling resources in time in a system frame for transmission of one or more UL data channels and HARQ signaling for acknowledging whether one or more downlink data channels have been successfully decoded, the one or more UL data channels and the HARQ signaling being configured based on a UL to DL resource ratio associated with a TDD subframe configuration; transmit the DCI to a UE; and receive the one or more UL data channels and the HARQ signaling using the scheduled resources and in accordance with the TDD subframe configuration.

To the accomplishment of the foregoing and related ends, the one or more aspects comprise the features hereinafter fully described and particularly pointed out in the claims. The following description and the appended drawings set forth in detail certain illustrative features of the one or more aspects. These features are indicative, however, of but a few of the various ways in which the principles of various aspects may be employed.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the drawings. It is to be noted, however, that the appended drawings illustrate only certain typical aspects of this disclosure and are therefore not to be considered limiting of its scope, for the description may admit to other equally effective aspects.

FIGS. 4A, 4B, 4C, 4D, 4E, 4F illustrate DL hybrid automatic request (HARQ) timelines and UL data channel scheduling timelines for UL-DL subframe configurations, in accordance with certain aspects of the present disclosure.

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Certain aspects of the present disclosure provide techniques for configuration of data channels and feedback signaling by considering the uplink (UL) to downlink (DL) ratio of a time division duplex (TDD) subframe configuration. For example, in some implementations, a TDD subframe configuration may have a fewer number of downlink subframes as compared to uplink subframes. Therefore, control information in one downlink subframe may schedule uplink channels in multiple uplink subframes. Certain aspects of the present disclosure provide techniques for scheduling such uplink channels, as well as associated feedback signaling, given the UL to DL ratio of the TDD subframe configuration.

The following description provides examples of communication systems, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method which is practiced using other structure, functionality, or structure and functionality in addition to, or other than, the various aspects of the disclosure set forth herein. It should be understood that any aspect of the disclosure disclosed herein may be embodied by one or more elements of a claim. The word "exemplary" is used herein to mean "serving as an example, instance, or illustration." Any aspect described herein as "exemplary" is not necessarily to be construed as preferred or advantageous over other aspects.

In general, any number of wireless networks may be deployed in a given geographic area. Each wireless network may support a particular radio access technology (RAT) and may operate on one or more frequencies. A RAT may also be referred to as a radio technology, an air interface, etc. A frequency may also be referred to as a carrier, a subcarrier, a frequency channel, a tone, a subband, etc. Each frequency may support a single RAT in a given geographic area in order to avoid interference between wireless networks of different RATs. In some cases, a 5G NR RAT network may be deployed.

Figure 1:
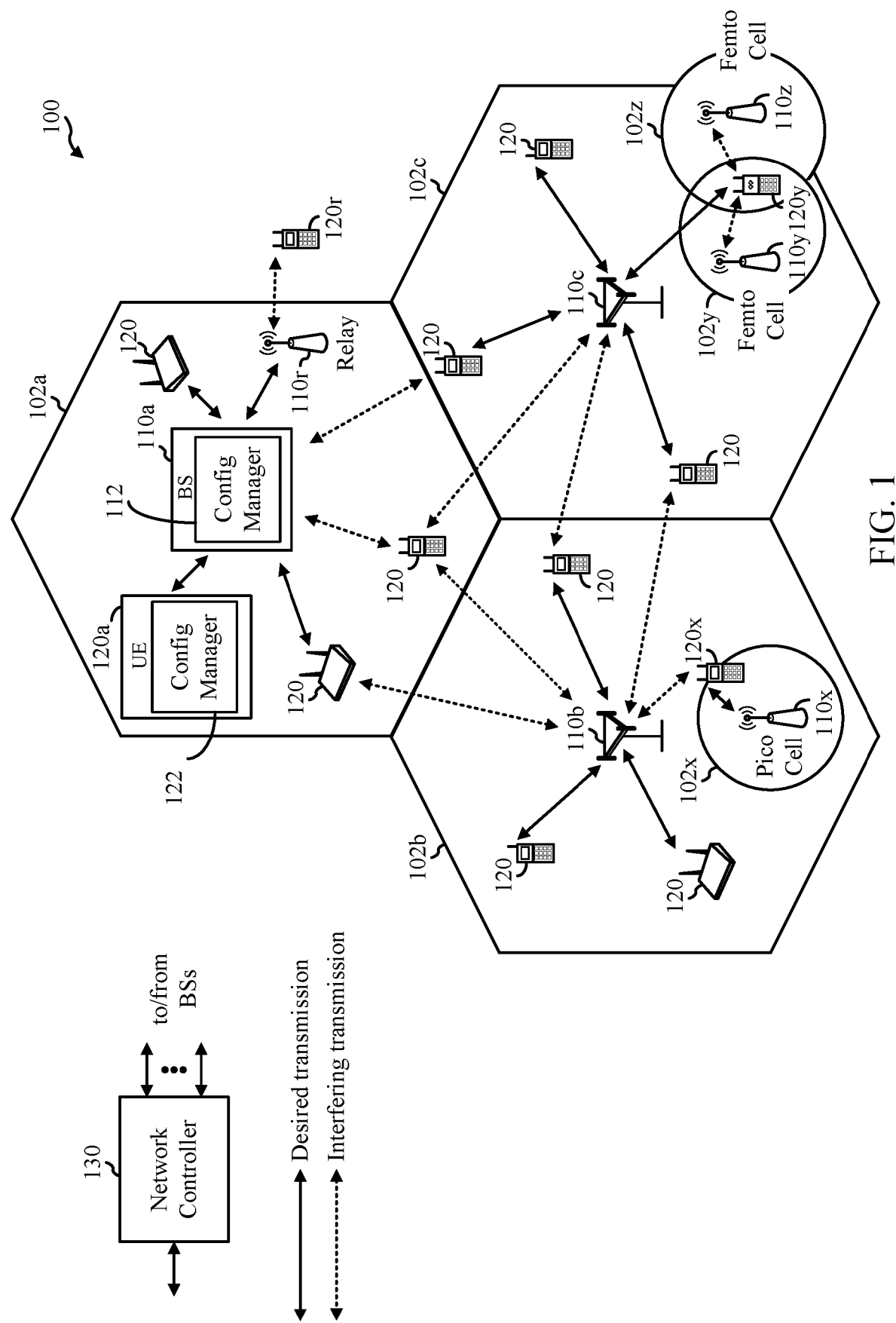
FIG. 1 is a block diagram conceptually illustrating an example telecommunications system, in accordance with certain aspects of the present disclosure.

FIG. 1 illustrates an example wireless communication network 100 in which aspects of the present disclosure may be performed. For example, the wireless communication network 100 may be an NR system (e.g., a 5G NR network).

As illustrated in FIG. 1, the wireless communication network 100 may include a number of base stations (BSs) 110a-z (each also individually referred to herein as BS 110 or collectively as BSs 110) and other network entities. A BS 110 may provide communication coverage for a particular geographic area, sometimes referred to as a "cell", which may be stationary or may move according to the location of a mobile BS 110. In some examples, the BSs 110 may be interconnected to one another and/or to one or more other BSs or network nodes (not shown) in wireless communication network 100 through various types of backhaul interfaces (e.g., a direct physical connection, a wireless connection, a virtual network, or the like) using any suitable transport network. In the example shown in FIG. 1, the BSs 110a, 110b and 110c may be macro BSs for the macro cells 102a, 102b and 102c, respectively. The BS 110x may be a pico BS for a pico cell 102x. The BSs 110y and 110z may be femto BSs for the femto cells 102y and 102z, respectively. A BS may support one or multiple cells. The BSs 110 communicate with user equipment (UEs) 120a-y (each also individually referred to herein as UE 120 or collectively as UEs 120) in the wireless communication network 100. The UEs 120 (e.g., 120x, 120y, etc.) may be dispersed throughout the wireless communication network 100, and each UE 120 may be stationary or mobile.

Wireless communication network 100 may also include relay stations (e.g., relay station 110r), also referred to as relays or the like, that receive a transmission of data and/or other information from an upstream station (e.g., a BS 110*a* or a UE 120*r*) and sends a transmission of the data and/or other information to a downstream station (e.g., a UE 120 or a BS 110), or that relays transmissions between UEs 120, to facilitate communication between devices.

A network controller 130 may couple to a set of BSs 110 and provide coordination and control for these BSs 110. The network controller 130 may communicate with the BSs 110 via a backhaul. The BSs 110 may also communicate with one another (e.g., directly or indirectly) via wireless or wireline backhaul.

According to certain aspects, the BSs 110 and UEs 120 may be configured for data and feedback scheduling. As shown in FIG. 1, the BS 110*a* includes a configuration manager 112. The configuration manager 112 may be configured to: generate first DCI for scheduling resources in time in a system frame for transmission of one or more UL data channels and HARQ signaling for acknowledging whether one or more downlink data channels have been successfully decoded, the one or more UL data channels and the HARQ signaling being configured based on a UL to DL resource ratio associated with a TDD subframe configuration; transmit the DCI to a UE; and receive the one or more UL data channels and the HARQ signaling using the scheduled resources and in accordance with the TDD subframe configuration, in accordance with aspects of the present disclosure. As shown in FIG. 1, the UE 120*a* includes a configuration manager 122. The configuration manager 122 may be configured to: receive first DCI for scheduling resources in time in a system frame for transmission of one or more UL data channels and HARQ signaling for acknowledging whether one or more downlink data channels have been successfully decoded, the one or more UL data channels and the HARQ signaling being configured based on a UL to DL resource ratio associated with a TDD subframe configuration; generate the one or more UL data channels and the HARQ signaling; and transmit the one or more UL data channels and the HARQ signaling using the scheduled resources and in accordance with the TDD subframe configuration.

Figure 2:
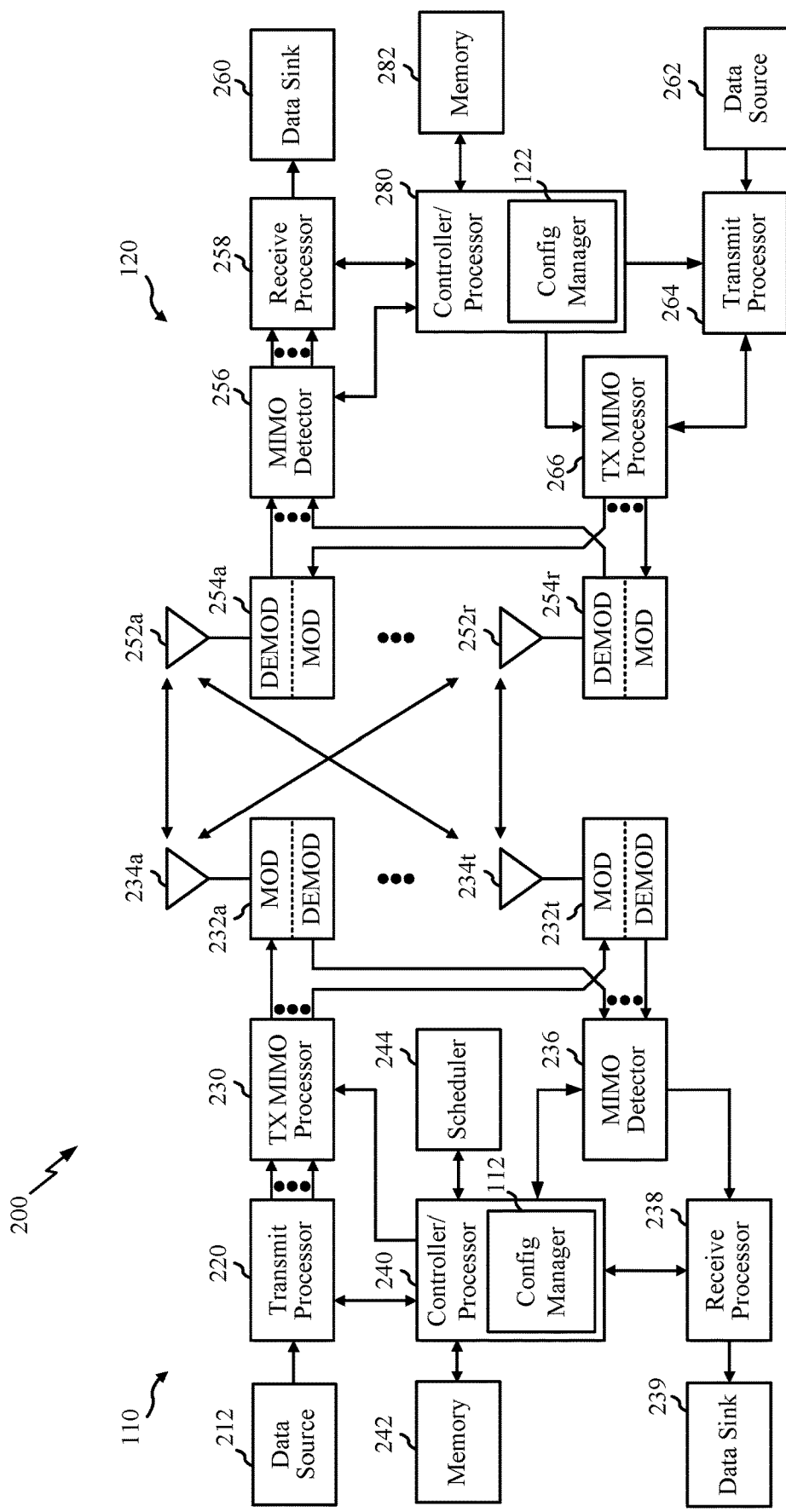
FIG. 2 is a block diagram conceptually illustrating a design of an example a base station (BS) and user equipment (UE), in accordance with certain aspects of the present disclosure.

FIG. 2 illustrates example components of BS 110*a* and UE 120*a* (e.g., in the wireless communication network 100 of FIG. 1), which may be used to implement aspects of the present disclosure.

At the BS 110*a*, a transmit processor 220 may receive data from a data source 212 and control information from a controller/processor 240. The control information may be for the physical broadcast channel (PBCH), physical control format indicator channel (PCFICH), physical hybrid ARQ indicator channel (PHICH), physical downlink control channel (PDCCH), group common PDCCH (GC PDCCH), etc. The data may be for the physical downlink shared channel (PDSCH), etc. The processor 220 may process (e.g., encode and symbol map) the data and control information to obtain data symbols and control symbols, respectively. The transmit processor 220 may also generate reference symbols, such as for the primary synchronization signal (PSS), secondary synchronization signal (SSS), and cell-specific reference signal (CRS). A transmit (TX) multiple-input multiple-output (MIMO) processor 230 may perform spatial processing (e.g., precoding) on the data symbols, the control symbols, and/or the reference symbols, if applicable, and may provide output symbol streams to the modulators (MODs) 232*a*-232*t*. Each modulator 232 may process a respective output symbol stream (e.g., for OFDM, etc.) to obtain an output sample stream. Each modulator may further process (e.g., convert to analog, amplify, filter, and upconvert) the output sample stream to obtain a downlink signal. Downlink signals from modulators 232*a*-232*t* may be transmitted via the antennas 234*a*-234*t*, respectively.

At the UE 120*a*, the antennas 252*a*-252*r* may receive the downlink signals from the BS 110*a* and may provide received signals to the demodulators (DEMODs) in transceivers 254*a*-254*r*, respectively. Each demodulator 254 may condition (e.g., filter, amplify, downconvert, and digitize) a respective received signal to obtain input samples. Each demodulator may further process the input samples (e.g., for OFDM, etc.) to obtain received symbols. A MIMO detector 256 may obtain received symbols from all the demodulators 254*a*-254*r*, perform MIMO detection on the received symbols if applicable, and provide detected symbols. A receive processor 258 may process (e.g., demodulate, deinterleave, and decode) the detected symbols, provide decoded data for the UE 120*a* to a data sink 260, and provide decoded control information to a controller/processor 280.

On the uplink, at UE 120*a*, a transmit processor 264 may receive and process data (e.g., for the physical uplink shared channel (PUSCH)) from a data source 262 and control information (e.g., for the physical uplink control channel (PUCCH) from the controller/processor 280. The transmit processor 264 may also generate reference symbols for a reference signal (e.g., for the sounding reference signal (SRS)). The symbols from the transmit processor 264 may be precoded by a TX MIMO processor 266 if applicable, further processed by the demodulators in transceivers 254*a*-254*r* (e.g., for SC-FDM, etc.), and transmitted to the BS 110*a*. At the BS 110*a*, the uplink signals from the UE 120*a* may be received by the antennas 234, processed by the modulators 232, detected by a MIMO detector 236 if applicable, and further processed by a receive processor 238 to obtain decoded data and control information sent by the UE 120*a*. The receive processor 238 may provide the decoded data to a data sink 239 and the decoded control information to the controller/processor 240. As illustrated, the controller/processor 240 may include the configuration manager 112, and the controller/processor 280 may include the configuration manager 122. Although shown at the controller/processor, other components of the UE 120*a* and BS 110*a* may be used to perform the operations described herein.

The memories 242 and 282 may store data and program codes for BS 110*a* and UE 120*a*, respectively. A scheduler 244 may schedule UEs for data transmission.

For downlink (DL) hybrid automatic request (HARQ) timing corresponding to a downlink (DL)-reference uplink (UL)/DL configuration used in single transmission in Evolved Universal Terrestrial Radio Access (EUTRA)-new radio (NR) Dual Connectivity (EN-DC) with time division duplex (TDD) primary cell (PCell), various configurations may apply. For example, for the LTE TDD PCell configuration, a physical downlink shared channel (PDSCH) acknowledgement (ACK) timeline may be used. For LTE DL carrier aggregation (CA) configuration, the secondary cell (SCell) may use the same DL-reference UL/DL configuration as the PCell. For the LTE frequency division duplex (FDD) secondary cell (SCell) configuration, a PDSCH ACK timeline defined for the SCell may be used. For the LTE TDD SCell with different UL/DL configurations as the TDD PCell, the PDSCH ACK timeline for SCell may be used. For the LTE TDD SCell with the same UL/DL configuration as the TDD PCell, the same PDSCH ACK timeline as the LTE TDD PCell may be used.

Example Downlink (DL) Hybrid Automatic Request (HARQ) Timing and Uplink Shared Channel Scheduling Timing Certain aspects of the present disclosure are directed to techniques for supporting subframe configurations for Evolved Universal Terrestrial Radio Access (EUTRA)-new radio (NR) Dual Connectivity (EN-DC). In some implementations, a UE may be unable to transmit on long-term evolution (LTE) and new radio (NR) simultaneously. Therefore, the current specification may support EN-DC with single UL transmission while switching between LTE and NR in a time division duplex (TDD) manner.

In some cases, subframes used for uplink (UL) hybrid automatic request (HARQ) feedback transmissions may be limited to allow those subframes to be used for UL NR transmissions. For single transmission switched uplink (UL) in EN-DC with TDD for a primary cell (PCell), the LTE PCell may be configured with a DL-reference UL/DL configuration. The DL-reference UL/DL configuration may be applied for determining the timing for downlink (DL) HARQ transmissions.

Various LTE TDD UL-DL configurations may be implemented. For example, certain LTE TDD UL-DL configurations (e.g., referred to as configurations #2, #4, or #5) may be used for DL-reference. For UL HARQ timing, a PCell's UL/DL configuration may be used except for a case where certain PCell's UL/DL configurations (e.g., configurations #0 or #6) are configured. Certain aspects of the present disclosure are directed to techniques for supporting TDD UL-DL configuration (e.g., configurations #0 and #6) for LTE PCell.

Figure 3:
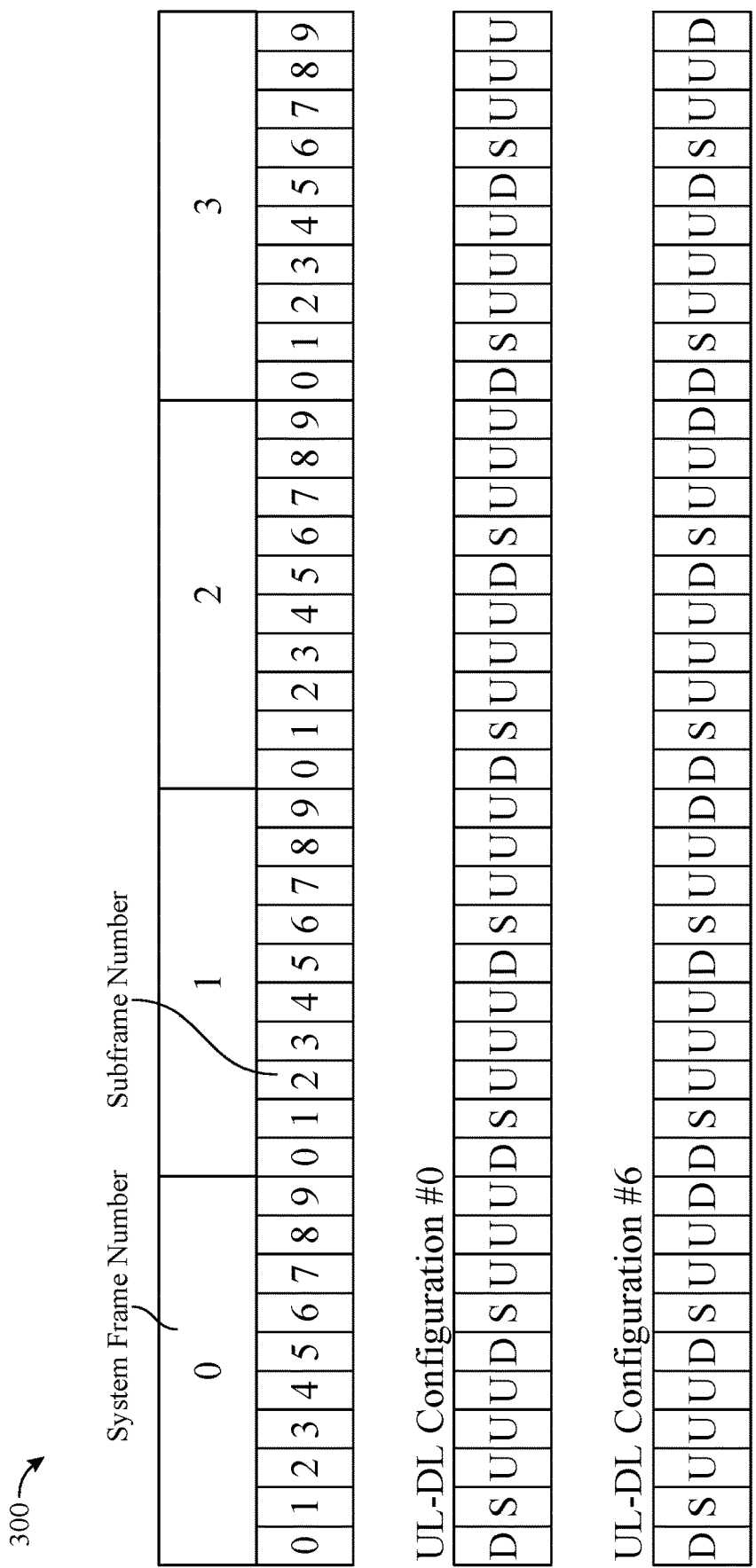
FIG. 3 illustrates an uplink (UL)-downlink (DL) subframe configuration.

FIG. 3 illustrates UL-DL configurations #0 and #6 of system frames 300. As illustrated, the UL-DL configurations #0 and #6 are represented with system frame numbers #0-#3, each of the system frames including 10 subframes #0-#9. As illustrated, certain subframes may be designated for downlink (D), while other subframes may be designated for uplink (U). As illustrated, a special subframe (S) may be included to facilitate switching from downlink to uplink. The difference between the UL-DL configurations #0 and #6 is that subframe 9 in each system frame is designated for uplink in UL-DL configurations #0, but designated for downlink in UL-DL configurations #6.

In certain aspects of the present disclosure, asynchronous UL HARQ for EN-DC single-UL with TDD-PCell and the PCell UL-DL configuration #0 and #6 may be used. When the TDD-PCell UL-DL configuration is #0 or #6 and EN-DC single-UL is configured, the UE may consider that a DCI format 0 or DCI format 4 (or any suitable DCI format) includes a HARQ process number indication field. The UE may transmit or retransmit a physical uplink shared channel (PUSCH) associated with a HARQ process ID based on the indication by the DCI format. As a consequence, there may be no specific timing relationship between a PUSCH transmission with a HARQ process ID and a corresponding DCI reception for scheduling a PUSCH with the same HARQ process ID (i.e., no synchronous HARQ).

In certain aspects, the UE may report a UE capability signaling to inform whether the UE supports asynchronous UL HARQ for EN-DC single-UL with TDD for PCell. If the UE does not report the UE capability signaling, it may be assumed that the UE does not support EN-DC single-UL with TDD for PCell when the TDD-PCell UL-DL configuration #0 or #6 are configured. In some cases, the UE capability signaling may not inform the UE capability with respect to EN-DC single-UL with TDD-PCell when the TDD-PCell UL-DL configuration is one of configurations #1 to #5. Thus, even if the UE is not capable of asynchronous UL HARQ, the UE may be configured with EN-DC single-UL with TDD-PCell when the TDD-PCell UL-DL configuration is one of configurations #1 to #5.

In some cases, HARQ-ACK feedback timing for PDSCH for the TDD-PCell may be determined according to a higher layer configuration of DL-reference UL-DL configuration, where the DL-reference UL-DL configuration is selected from UL-DL configuration #2, #4, or #5. In certain aspects of the present disclosure, PUSCH scheduling timing may be determined by the TDD-PCell UL-DL configuration (e.g., based on corresponding TDD-PCell UL-DL configurations #0 and #6).

Figure 4C:
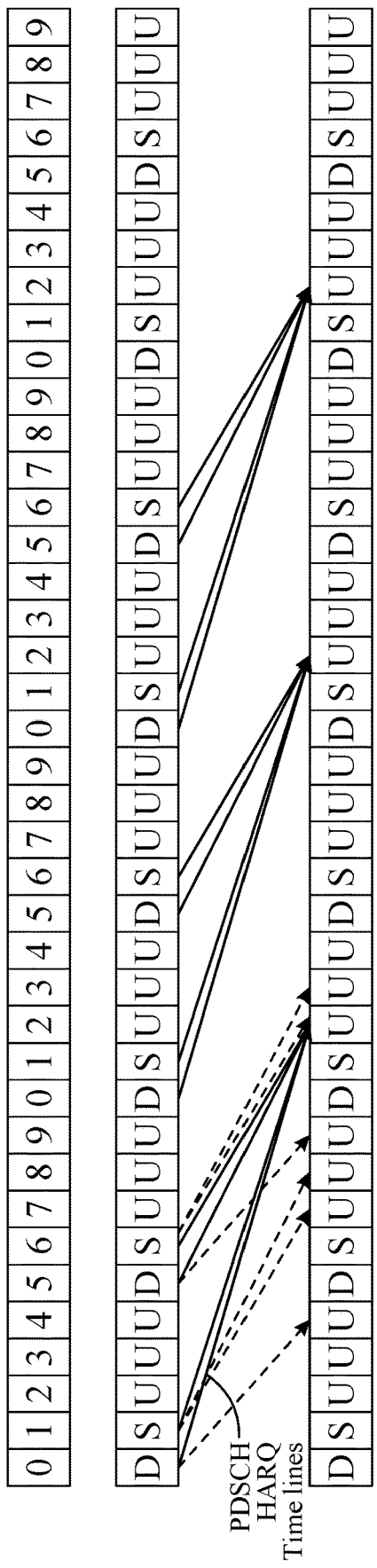

FIGS. 4A, 4B, 4C, 4D, 4E, and 4F illustrate DL HARQ timelines and PUSCH scheduling timelines for each of TDD-PCell UL-DL configuration #0 and #6 and DL-reference UL-DL configuration #2, #4, and #5, in accordance with certain aspects of the present disclosure. For example, FIG. 4A illustrates PDSCH HARQ timelines (shown by solid arrows) and PUSCH scheduling timelines (shown by dotted arrows) for TDD UL-DL configuration #0, DL-reference UL-DL configuration #2. For example, HARQ timeline 402 indicates that that subframe 406 is to be used to provide HARQ feedback for downlink data in subframe 404, and PUSCH scheduling timeline 410 indicates that an UL grant in subframe 404 schedules a PUSCH (also referred to as an UL channel) in subframe 412.

FIG. 4B illustrates PDSCH HARQ timelines (shown by solid arrows) and PUSCH scheduling timelines (shown by dotted arrows) for TDD UL-DL configuration #0, and DL-reference UL-DL configuration #4. FIG. 4C illustrates PDSCH HARQ timelines (shown by solid arrows) and PUSCH scheduling timelines (shown by dotted arrows) for TDD UL-DL configuration #0, and DL-reference UL-DL configuration #5.

Figure 4D:
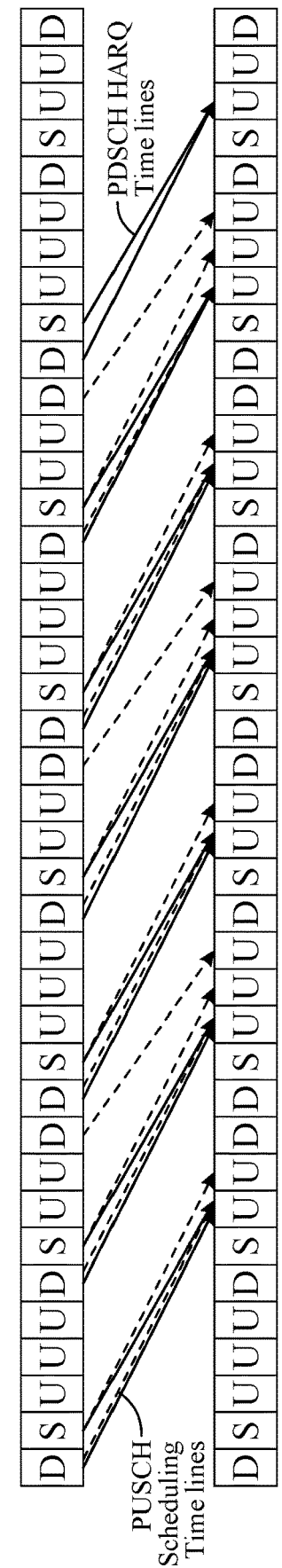
Figure 4E:
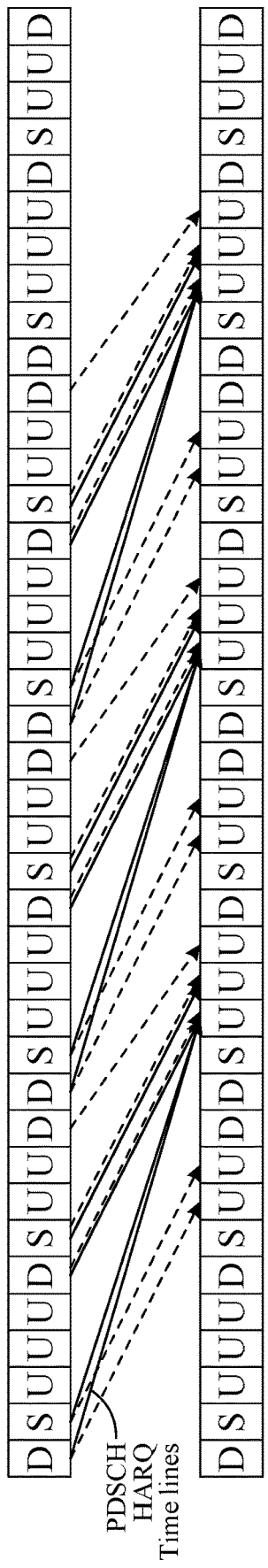
Figure 4F:
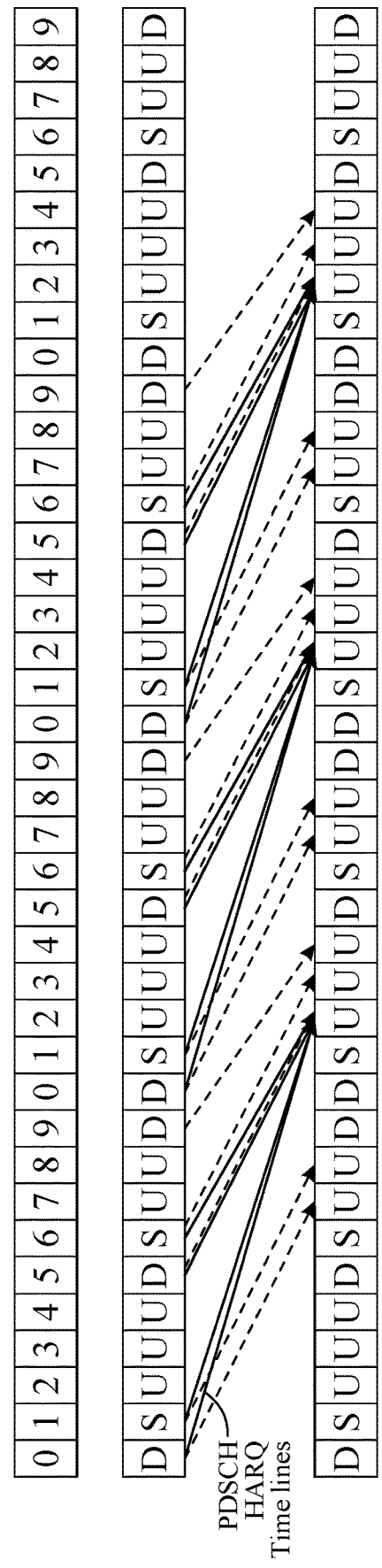

FIG. 4D illustrates PDSCH HARQ timelines (shown by solid arrows) and PUSCH scheduling timelines (shown by dotted arrows) for TDD UL-DL configuration #6, and DL-reference UL-DL configuration #2. FIG. 4E illustrates PDSCH HARQ timelines (shown by solid arrows) and PUSCH scheduling timelines (shown by dotted arrows) for TDD UL-DL configuration #6, and DL-reference UL-DL configuration #4. FIG. 4F illustrates PDSCH HARQ timelines (shown by solid arrows) and PUSCH scheduling timelines (shown by dotted arrows) for TDD UL-DL configuration #6, and DL-reference UL-DL configuration #5. Certain aspects of the present disclosure provide techniques for configuration of data channels and feedback signaling by considering the uplink (UL) to downlink (DL) ratio of a time division duplex (TDD) subframe configuration.

Figure 5:
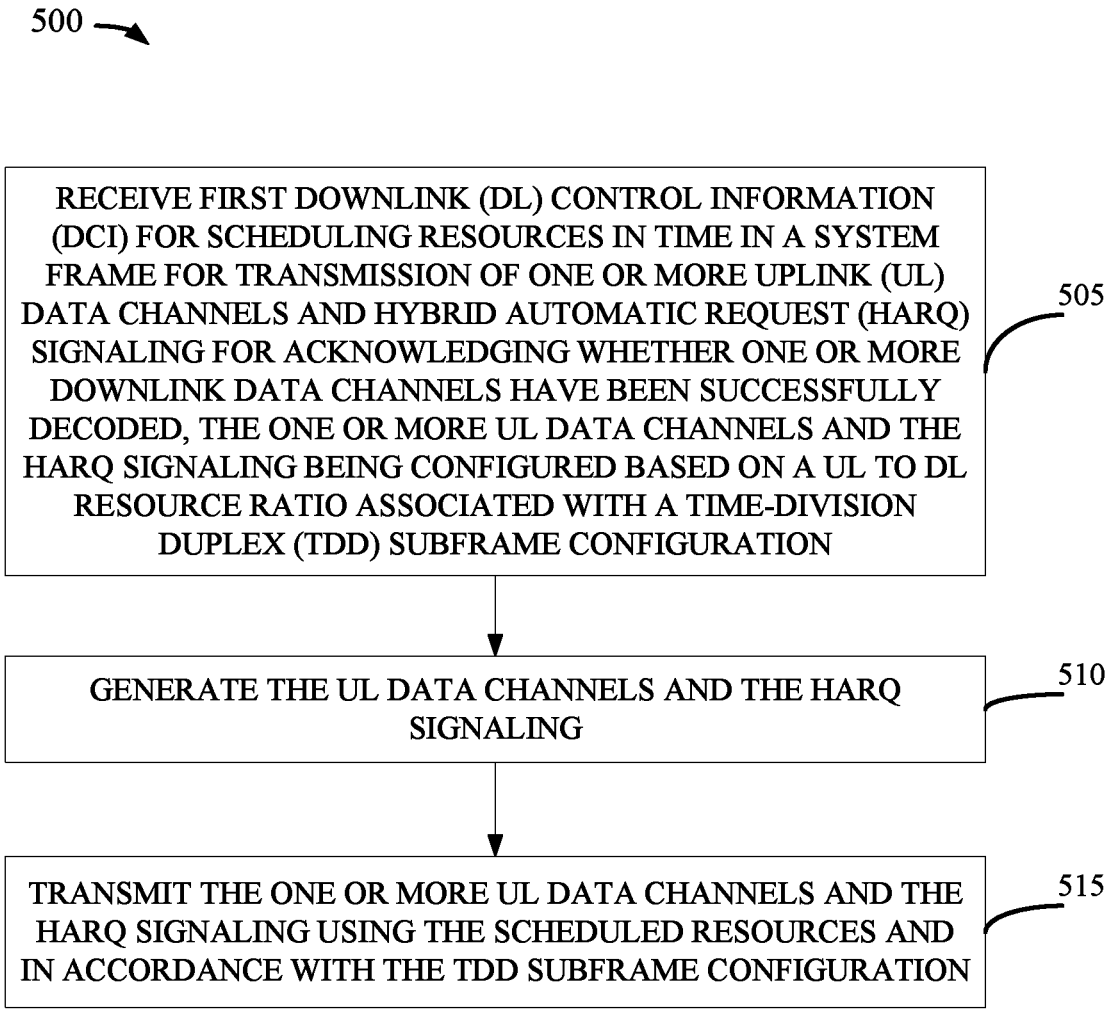
FIG. 5 is a flow diagram illustrating example operations for wireless communication by a UE, in accordance with certain aspects of the present disclosure.

FIG. 5 is a flow diagram illustrating example operations 500 for wireless communication, in accordance with certain aspects of the present disclosure. The operations 500 may be performed, for example, by UE (e.g., such as a UE 120a in the wireless communication network 100).

Operations 500 may be implemented as software components that are executed and run on one or more processors (e.g., controller/processor 280 of FIG. 2). Further, the transmission and reception of signals by the UE in operations 500 may be enabled, for example, by one or more antennas (e.g., antennas 252 of FIG. 2). In certain aspects, the transmission and/or reception of signals by the UE may be implemented via a bus interface of one or more processors (e.g., controller/processor 280) obtaining and/or outputting signals.

The operations 500 may begin, at block 505, by receiving first downlink (DL) control information (DCI) for scheduling resources in time in a system frame for transmission of one or more uplink (UL) data channels (e.g., PUSCHs) and HARQ signaling for acknowledging whether one or more downlink data channels (e.g., physical downlink shared channels (PDSCHs), or downlink transport blocks) have been successfully decoded. In certain aspects, the one or more UL data channels and the HARQ signaling may be configured based on a UL to DL resource ratio associated with a TDD subframe configuration. For instance, the inclusion of one or more of an UL index field or DAI field in an UL grant (e.g., in the first DCI), and configuration of the one or more UL data channels and the HARQ signaling may be dependent on whether a TDD subframe configuration has a greater or equal quantity UL subframes as compared to DL subframes for UL data. As an example, TDD UL-DL configuration #0 may have a greater number of UL subframes than DL subframes, and various techniques for configuration of UL data channels and HARQ signaling is provided herein. At block 510, the UE generates the UL data channels and the HARQ signaling, and at block 515, transmits the UL data channels and the HARQ signaling using the scheduled resources and in accordance with the TDD subframe configuration.

In certain aspects, the first DCI may include at least one of an UL index field indicating whether the one or more UL data channels are scheduled in two subframes, or a downlink assignment index (DAI) field indicating a quantity of the one or more downlink data channels that the HARQ signaling is to acknowledge. In certain aspects, the first DCI may include both the UL index field and the DAI field. In this case, the DCI may be transmitted in a common search space or UE-specific search space.

In certain aspects, the first DCI may include the UL index field (e.g., if the TDD subframe configuration includes a fewer number of DL subframes than UL subframes). The first DCI may not include the DAI field if the DCI is transmitted in a common search space. Moreover, the first DCI may include both the UL index field and the DAI field if the DCI is transmitted in a UE-specific search space. In certain aspects, generating the HARQ signaling may include assuming that more than one downlink data channels are not scheduled in multiple subframes associated with the subframe where the HARQ signaling takes place.

In certain aspects, the first DCI may include the DAI field. Moreover, the first DCI may not include the UL index field if the first DCI is transmitted in a common search space, and the first DCI may include both the UL index field and the DAI field if the DCI is transmitted in a UE-specific search space. In some cases, the UE may interpret a value of the UL index field according to a pre-configuration, as described in more detail herein. The pre-configuration may be according to a higher-layer parameter or a specific value, in some cases. In certain aspects, the first DCI may include only one of UL index field and DAI field if the DCI is in accordance with DCI format 0 transmitted in a common search space.

In certain aspects, the first DCI is received in a subframe of the system frame and schedules resources for at least one of the one or more downlink data channels. In this case, the operations 500 may also include receiving a second DCI in at least one following subframe of the system frame, the second DCI scheduling resources for at least another one of the one or more downlink data channels. The DAI field may indicate an accumulated quantity of the data channels in the subframe and the at least one following subframe.

In certain aspects, generating the HARQ signaling may include assuming that the one or more downlink data channels are not scheduled in multiple subframes of the system frame. In certain aspects, the first DCI may be received in a subframe of the system frame and schedules resources for at least one of the one or more downlink data channels, and generating the HARQ signaling may include multiplexing a HARQ-acknowledgment (ACK) indication for a downlink data in the subframe and one or more following subframes regardless of whether the UE detects one or more DCIs scheduling downlink data in the one or more following subframes.

In certain aspects, the operations 500 may include determining a subframe for transmission of one of the one or more UL data channels based on a TDD-PCell UL-DL configuration and a subframe index identified by an UL grant scheduling the one of the one or more UL data channels. In some cases, the resources for the transmission of the one or more UL data packets are in accordance with a TDD-PCell UL-DL configuration #0 or #6 and the resources for the transmission of the HARQ signaling may be in accordance with a DL-reference UL-DL configuration #2, #4, or #5. For example, the aspects described herein may be applied if the TDD-PCell UL-DL configuration #0 or #6, and the DL-reference UL-DL configuration #2, #4, or #5 are configured for the communication of the UL data channels and HARQ signaling.

Figure 6:
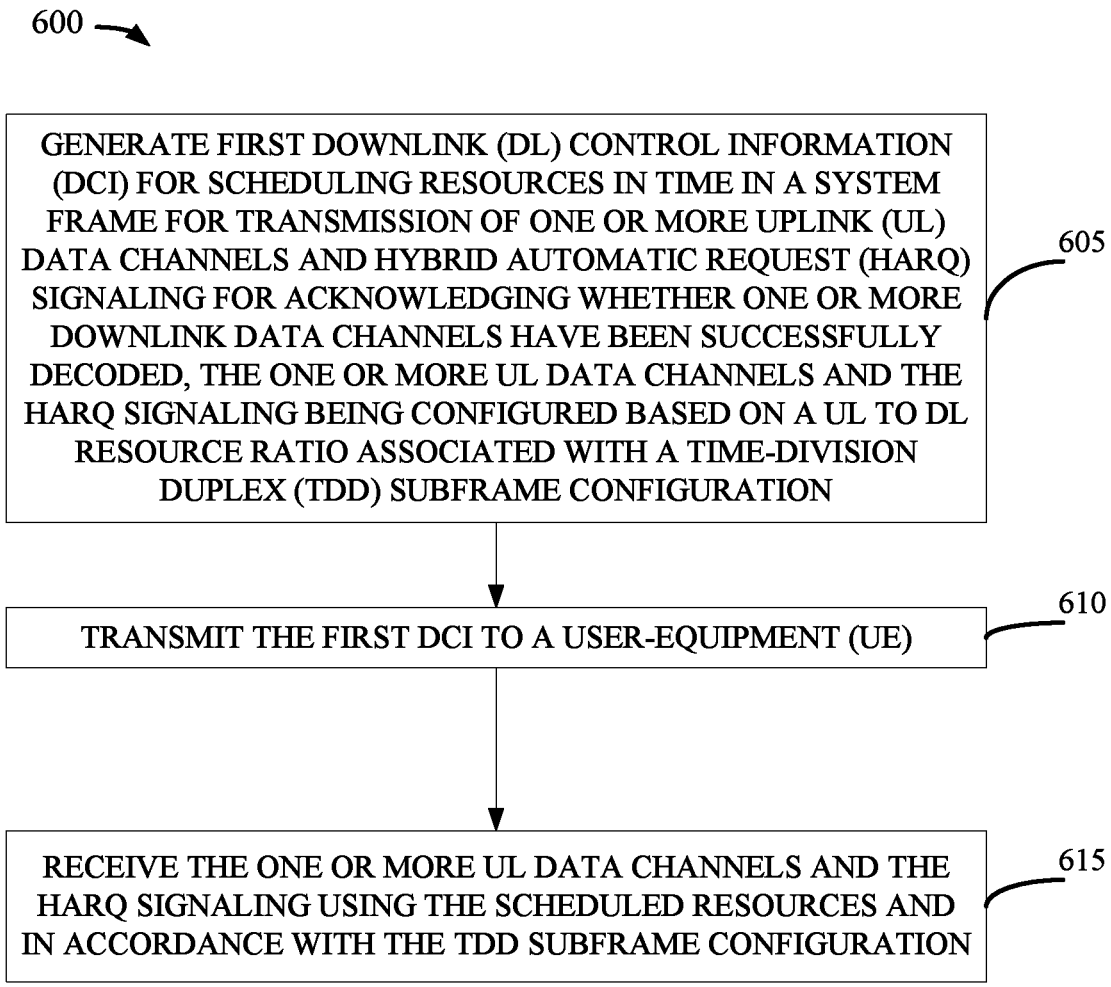
FIG. 6 is a flow diagram illustrating example operations for wireless communication by a BS, in accordance with certain aspects of the present disclosure.

FIG. 6 is a flow diagram illustrating example operations 600 for wireless communication, in accordance with certain aspects of the present disclosure. The operations 600 may be performed, for example, by a BS (e.g., such as the BS 110a in the wireless communication network 100). The operations 600 may be complementary to the operations 500. Operations 600 may be implemented as software components that are executed and run on one or more processors (e.g., controller/processor 240 of FIG. 2). Further, the transmission and reception of signals by the BS in operations 600 may be enabled, for example, by one or more antennas (e.g., antennas 234 of FIG. 2). In certain aspects, the transmission and/or reception of signals by the BS may be implemented via a bus interface of one or more processors (e.g., controller/processor 240) obtaining and/or outputting signals.

The operations 600 may begin, at block 605, by generating first DCI for scheduling resources in time in a system frame for transmission of one or more UL data channels and HARQ signaling for acknowledging whether one or more downlink data channels have been successfully decoded. In certain aspects, the one or more UL data channels and the HARQ signaling being configured based on a UL to DL resource ratio associated with a TDD subframe configuration, as described herein. At block 610, the BS transmits the DCI to a UE, and at block 615, receives the one or more UL data channels and the HARQ signaling using the scheduled resources and in accordance with the TDD subframe configuration.

Figure 7:
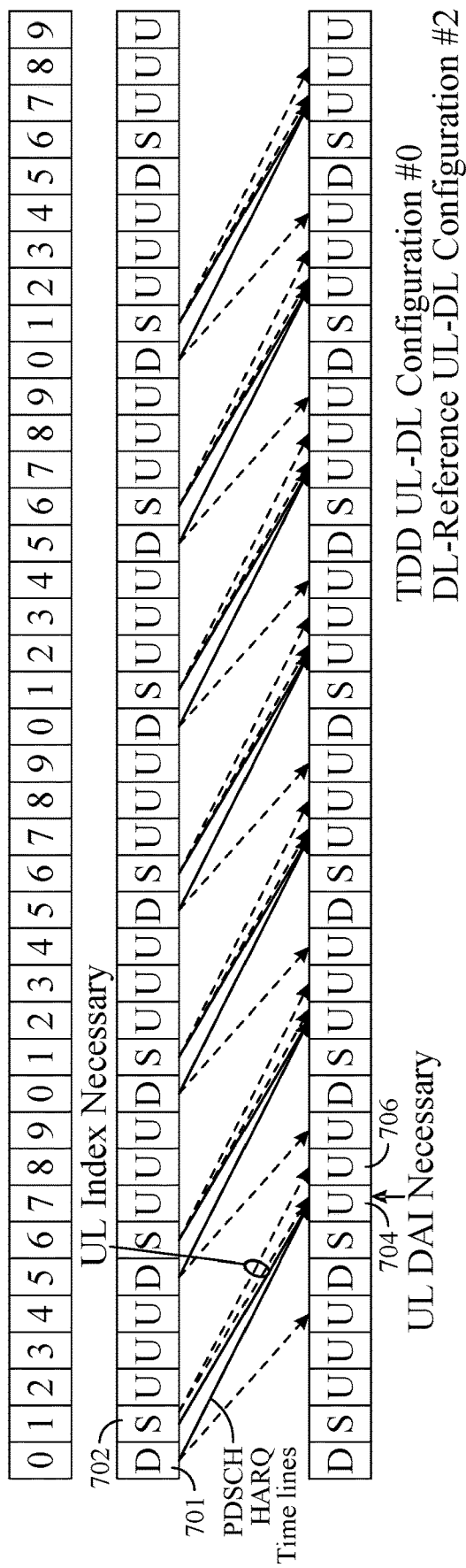
FIG. 7 illustrates DL HARQ timelines and UL data channel scheduling timelines for an UL-DL subframe configuration and a DL-reference subframe configuration, in accordance with certain aspects of the present disclosure.

FIG. 7 illustrates PDSCH HARQ timelines (shown by solid arrows) and PUSCH scheduling timelines (shown by dotted arrows) for TDD UL-DL configuration #0, DL-reference UL-DL configuration #2. For TDD-PCell UL-DL configuration #0 and DL-ref UL-DL configuration #2, #4, or #5, UL index field in the UL grant may be used since there are fewer DL subframes than UL subframes. For example, DL:UL subframe ratio may be 2:3. In other words, there are two DL subframes for every three UL subframes in a system frame. Thus, DCI in one subframe may provide an UL grant for PUSCH in more than one subframe. As a result, an UL index field may be used. The UL index field may indicate whether a PUSCH is scheduled in a subframe, a PUSCH is scheduled in a subsequent subframe, or both. For instance, an UL index field in subframe 702 (e.g., subframe #1) may indicate that PUSCH is scheduled for one or both of subframes 704, 706.

In certain aspects, one UL grant on the DL may schedule more than one PUSCHs on the UL. Moreover, the UL grant may include an UL DAI field because one PUSCH (e.g., PUSCH in subframe #7) may multiplex more than one HARQ-ACK bit for downlink data in multiple subframes. DAI is an index, which is communicated to UE by the BS and indicates a quantity of downlink data channels that HARQ signaling by the UE is to acknowledge. For example, subframe 704 may provide HARQ ACK/NAK feedback for both PDSCHs in subframes 701, 702. Thus, the UL grant in subframe 702 may include a DAI field to indicate the number of DL subframes (e.g., one or more of PDSCHs in subframes 701, 702) that are to be acknowledged. However, in LTE, the UL DAI field and the UL index field may not be configured at the same time. Therefore, only one 2-bit field may be used as either UL index or UL DAI depending on whether TDD UL-DL configuration #0 is used.

In certain aspects of the present disclosure, for EN-DC single-UL with TDD-PCell and TDD-PCell UL-DL configuration #0, a DCI format 0/4 (e.g., for DCI in subframe 702) may have two separate 2-bit fields; one being an UL index field, and the other being the UL DAI field. In certain aspects, DCI format 4 in UE-specific search space and DCI format 0 in a common search space/UE-specific search space may include the two 2-bit fields, one as the UL index field and the other as the UL DAI field. In some cases, the DCI UL grant may include the two 2-bits fields, regardless of search space used.

In another aspect, DCI format 4 in UE-specific search space and DCI format 0 in UE-specific search space may include the two 2-bit fields, while DCI format 0 in common search space may include only one 2-bit field, which is used as an UL index field. In this case, when the UE receives DCI format 0 in common search space, the UE may assume that PDSCH is not scheduled in both subframes #0 and #1 (e.g., subframes 701, 702), or in both subframes #5 and #6 because no DAI field is included. In other words, if the UE receives a DCI in accordance with DCI format 0 in subframe 702, the UE assumes that HARQ feedback is not scheduled for PDSCH in both subframes 701, 702. Thus, the UE assumes that HARQ feedback is only scheduled for one of, or neither of, subframes 701, 702.

In some aspects, DCI format 4 in a UE-specific search space and DCI format 0 in UE-specific search space may be configured to include the two separate 2-bit fields, while DCI format 0 in common search space may be configured to include only one 2-bit field, which is used as an UL DAI field. In this case, when the UE receives DCI format 0 in common search space, the UE may assume a pre-determined or configured value for the UL index.

Figure 8:
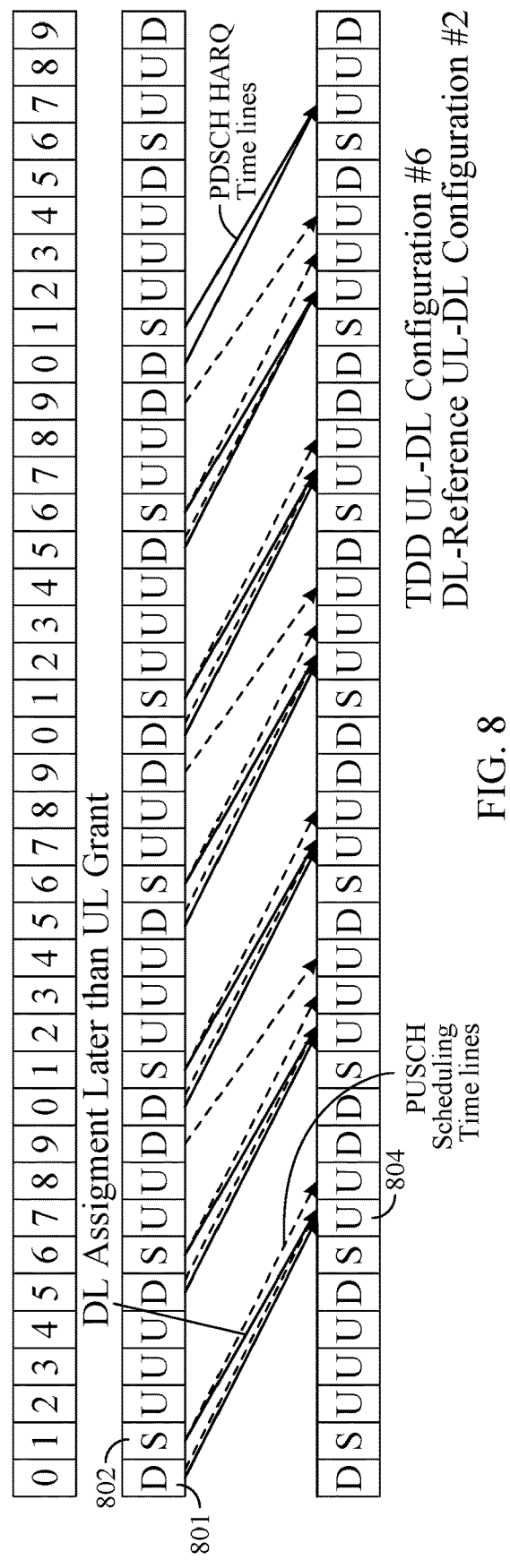
FIG. 8 illustrates DL HARQ timelines and UL data channel scheduling timelines for another UL-DL subframe configuration and another DL-reference subframe configuration, in accordance with certain aspects of the present disclosure.

FIG. 8 illustrates PDSCH HARQ timelines (shown by solid arrows) and PUSCH scheduling timelines (shown by dotted arrows) for TDD UL-DL configuration #6, and DL-reference UL-DL configuration #2. As illustrated, for a given subframe where PUSCH and HARQ-ACK can be transmitted, there may be cases where DL assignment is mapped in the subframe (e.g., mapped to subframe #1 (subframe 802)) later than the subframe where UL grant is mapped (e.g., mapped to subframe #0 (subframe 801)). For instance, the BS 110 may schedule a downlink transmission in subframe #0, and further schedule another downlink transmission in subframe #1. HARQ-ACK for PDSCH in subframes #0 and #1 may be transmitted in subframe #7 (subframe 804). For subframe #7, the UL grant may be in subframe #0. Moreover, UL DAI value in a UL grant may be an accumulated number of scheduled PDSCH. However, the BS may not take the DL assignment (e.g., in subframe #1) after the UL grant into account when the BS generates the DAI field to be transmitted in subframe #0. In other words, the BS may only take into account the DL assignment in subframe #0 as the DL assignment in subframe #1 may not have yet been determined.

In certain aspects, for EN-DC single-UL with TDD-PCell and TDD-PCell UL-DL configuration #6 and DL-reference UL-DL configuration #5, the UE may assume that PDSCH is not scheduled via subframe #1 (and/or subframe #6). In other words, the HARQ-ACK may be generated for only the PDSCH scheduled in subframe #0.

In other aspects, the UL DAI in DCI in subframe #0 may indicate an accumulated number of scheduled PDSCHs over subframes #0 and #1. For instance, UL DAI may indicate the accumulated number over all the subframes associated with a HARQ-ACK feedback subframe. In other words, the BS 110 may determine the value of UL DAI by look-ahead functionality by not only considering subframe #0 in which the DAI field is transmitted, but also by considering one or more following subframes (e.g., subframe #1) that may schedule a PDSCH.

In another aspects, when the UE transmits a PUSCH in subframe #2 (or subframe #7), the UE multiplexes HARQ-ACK for PDSCH in subframe #6 (or subframe 1). In other words, based on the UL DAI value in the UL grant, the UE appends additional HARQ-ACK for PDSCH after the UL grant (assuming the PDSCH is scheduled). For example, the UE may include HARQ-ACK for PDSCH across multiple subframes regardless of whether PDSCH is actually detected in the subframes.

Figure 9:
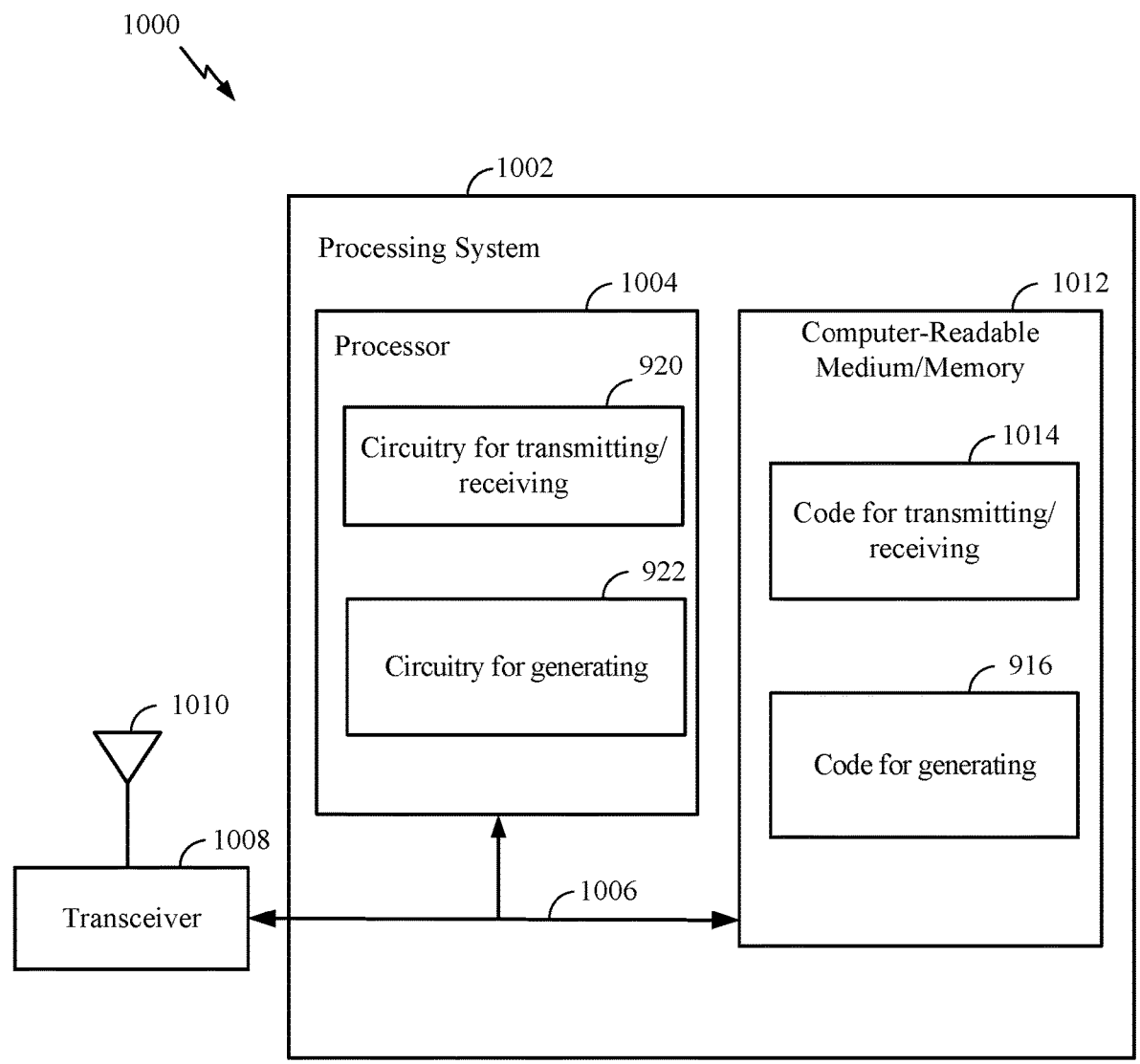
FIG. 9 illustrates a communications device that may include various components configured to perform operations for the techniques disclosed herein.

FIG. 9 illustrates a communications device 900 that may include various components (e.g., corresponding to means-plus-function components) configured to perform operations for the techniques disclosed herein, such as the operations illustrated in FIGS. 5 and 6. The communications device 900 includes a processing system 902 coupled to a transceiver 908 (e.g., a transmitter and/or a receiver). The transceiver 908 is configured to transmit and receive signals for the communications device 900 via an antenna 910, such as the various signals as described herein. The processing system 902 may be configured to perform processing functions for the communications device 900, including processing signals received and/or to be transmitted by the communications device 900.

The processing system 902 includes a processor 904 coupled to a computer-readable medium/memory 912 via a bus 906. In certain aspects, the computer-readable medium/memory 912 is configured to store instructions (e.g., computer-executable code) that when executed by the processor 904, cause the processor 904 to perform the operations illustrated in FIGS. 5 and 6, or other operations for performing the various techniques discussed herein for security key derivation. In certain aspects, computer-readable medium/memory 912 stores code 914 for receiving and transmitting; code 916 for generating. In certain aspects, the processor 904 has circuitry configured to implement the code stored in the computer-readable medium/memory 912. The processor 904 includes circuitry 920 for receiving and transmitting; circuitry 922 for generating.

The techniques described herein may be used for various wireless communication technologies, such as NR (e.g., 5G NR), 3GPP Long Term Evolution (LTE), LTE-Advanced (LTE-A), code division multiple access (CDMA), time division multiple access (TDMA), frequency division multiple access (FDMA), orthogonal frequency division multiple access (OFDMA), single-carrier frequency division multiple access (SC-FDMA), time division synchronous code division multiple access (TD-SCDMA), and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS). LTE and LTE-A are releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). NR is an emerging wireless communications technology under development.

The techniques described herein may be used for the wireless networks and radio technologies mentioned above as well as other wireless networks and radio technologies. For clarity, while aspects may be described herein using terminology commonly associated with 3G, 4G, and/or 5G wireless technologies, aspects of the present disclosure can be applied in other generation-based communication systems.

In 3GPP, the term "cell" can refer to a coverage area of a Node B (NB) and/or a NB subsystem serving this coverage area, depending on the context in which the term is used. In NR systems, the term "cell" and BS, next generation NodeB (gNB or gNodeB), access point (AP), distributed unit (DU), carrier, or transmission reception point (TRP) may be used interchangeably. A BS may provide communication coverage for a macro cell, a pico cell, a femto cell, and/or other types of cells. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having an association with the femto cell (e.g., UEs in a Closed Subscriber Group (CSG), UEs for users in the home, etc.). A BS for a macro cell may be referred to as a macro BS. A BS for a pico cell may be referred to as a pico BS. A BS for a femto cell may be referred to as a femto BS or a home BS.

A UE may also be referred to as a mobile station, a terminal, an access terminal, a subscriber unit, a station, a Customer Premises Equipment (CPE), a cellular phone, a smart phone, a personal digital assistant (PDA), a wireless modem, a wireless communication device, a handheld device, a laptop computer, a cordless phone, a wireless local loop (WLL) station, a tablet computer, a camera, a gaming device, a netbook, a smartbook, an ultrabook, an appliance, a medical device or medical equipment, a biometric sensor/device, a wearable device such as a smart watch, smart clothing, smart glasses, a smart wrist band, smart jewelry (e.g., a smart ring, a smart bracelet, etc.), an entertainment device (e.g., a music device, a video device, a satellite radio, etc.), a vehicular component or sensor, a smart meter/sensor, industrial manufacturing equipment, a global positioning system device, or any other suitable device that is configured to communicate via a wireless or wired medium. Some UEs may be considered machine-type communication (MTC) devices or evolved MTC (eMTC) devices. MTC and eMTC UEs include, for example, robots, drones, remote devices, sensors, meters, monitors, location tags, etc., that may communicate with a BS, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, which may be narrowband IoT (NB-IoT) devices.

Certain wireless networks (e.g., LTE) utilize orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kHz and the minimum resource allocation (called a "resource block" (RB)) may be 12 subcarriers (or 180 kHz). Consequently, the nominal Fast Fourier Transfer (FFT) size may be equal to 128, 256, 512, 1024 or 2048 for system bandwidth of 1.25, 2.5, 5, 10, or 20 megahertz (MHz), respectively. The system bandwidth may also be partitioned into subbands. For example, a subband may cover 1.8 MHz (e.g., 6 RBs), and there may be 1, 2, 4, 8, or 16 subbands for system bandwidth of 1.25, 2.5, 5, 10 or 20 MHz, respectively. In LTE, the basic transmission time interval (TTI) or packet duration is the 1 ms subframe.

NR may utilize OFDM with a CP on the uplink and downlink and include support for half-duplex operation using TDD. In NR, a subframe is still 1 ms, but the basic TTI is referred to as a slot. A subframe contains a variable number of slots (e.g., 1, 2, 4, 8, 16, . . . slots) depending on the subcarrier spacing. The NR RB is 12 consecutive frequency subcarriers. NR may support a base subcarrier spacing of 15 KHz and other subcarrier spacing may be defined with respect to the base subcarrier spacing, for example, 30 kHz, 60 kHz, 120 kHz, 240 kHz, etc. The symbol and slot lengths scale with the subcarrier spacing. The CP length also depends on the subcarrier spacing. Beamforming may be supported and beam direction may be dynamically configured. MIMO transmissions with precoding may also be supported. In some examples, MIMO configurations in the DL may support up to 8 transmit antennas with multi-layer DL transmissions up to 8 streams and up to 2 streams per UE. In some examples, multi-layer transmissions with up to 2 streams per UE may be supported. Aggregation of multiple cells may be supported with up to 8 serving cells.

In some examples, access to the air interface may be scheduled. A scheduling entity (e.g., a BS) allocates resources for communication among some or all devices and equipment within its service area or cell. The scheduling entity may be responsible for scheduling, assigning, reconfiguring, and releasing resources for one or more subordinate entities. That is, for scheduled communication, subordinate entities utilize resources allocated by the scheduling entity. Base stations are not the only entities that may function as a scheduling entity. In some examples, a UE may function as a scheduling entity and may schedule resources for one or more subordinate entities (e.g., one or more other UEs), and the other UEs may utilize the resources scheduled by the UE for wireless communication. In some examples, a UE may function as a scheduling entity in a peer-to-peer (P2P) network, and/or in a mesh network. In a mesh network example, UEs may communicate directly with one another in addition to communicating with a scheduling entity.

In some examples, two or more subordinate entities (e.g., UEs) may communicate with each other using sidelink signals. Real-world applications of such sidelink communications may include public safety, proximity services, UE-to-network relaying, vehicle-to-vehicle (V2V) communications, Internet of Everything (IoE) communications, IoT communications, mission-critical mesh, and/or various other suitable applications. Generally, a sidelink signal may refer to a signal communicated from one subordinate entity (e.g., UE1) to another subordinate entity (e.g., UE2) without relaying that communication through the scheduling entity (e.g., UE or BS), even though the scheduling entity may be utilized for scheduling and/or control purposes. In some examples, the sidelink signals may be communicated using a licensed spectrum (unlike wireless local area networks, which typically use an unlicensed spectrum).

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

The various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user terminal 120 (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-Ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/ or encoded) thereon, the instructions being executable by one or more processors to perform the operations described herein, for example, instructions for performing the operations described herein.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

The invention claimed is:

1. A method for wireless communication by a user-equipment (UE), comprising:
   receiving first downlink control information (DCI) for scheduling resources in time in a system frame for transmission of one or more uplink (UL) data channels and hybrid automatic request (HARQ) signaling for acknowledging whether one or more downlink (DL) data channels have been successfully decoded, wherein:
      the resources for transmission of the one or more UL data channels and the HARQ signaling are scheduled using a UL-to-DL resource ratio of a time-division duplex (TDD) subframe configuration for the system frame;
      the first DCI comprises an UL index field;
      the first DCI does not comprise a DL assignment index (DAI) field if the DCI is transmitted in a common search space; and
      the first DCI comprises both the UL index field and the DAI field if the DCI is transmitted in a UE-specific search space;
   generating the one or more UL data channels and the HARQ signaling assuming that more than one DL data channels are not scheduled in multiple subframes associated with the subframe where the HARQ signaling takes place; and
   transmitting the one or more UL data channels and the HARQ signaling using the scheduled resources and in accordance with the TDD subframe configuration.

2. The method of claim 1, wherein the TDD subframe configuration comprises a TDD-primary cell (PCell) UL-DL configuration, the method further comprising determining a subframe for transmission of one of the one or more UL data channels based on the TDD-PCell UL-DL configuration and a subframe index identified by an UL grant scheduling the one of the one or more UL data channels.

3. The method of claim 1, wherein:
   the UL index field indicates whether the one or more UL data channels are scheduled in at least two subframes; and the DAI field indicates a quantity of the one or more DL data channels that the HARQ signaling is to acknowledge.

4. The method of claim 3, wherein:
the first DCI is received in a subframe of the system frame and schedules resources for at least one of the one or more DL data channels;
the method further comprises receiving a second DCI in at least one following subframe of the system frame, the second DCI scheduling resources for at least another one of the one or more DL data channels; and
the DAI field indicates an accumulated quantity of the data channels in the subframe and the at least one following subframe.

5. The method of claim 3, wherein generating the HARQ signaling comprises assuming that the one or more DL data channels are not scheduled in multiple subframes of the system frame.

6. The method of claim 1, wherein:
the first DCI is received in a subframe of the system frame; and
generating the HARQ signaling comprises multiplexing a HARQ-acknowledgment (ACK) indication for DL data in the subframe and one or more following subframes regardless of whether the UE detects one or more DCIs scheduling DL data in the one or more following subframes.

7. The method of claim 1, wherein:
the TDD subframe configuration comprises a TDD-PCell UL-DL configuration #0 or #6;
the resources for the transmission of the one or more UL data channels are in accordance with the TDD-PCell UL-DL configuration #0 or #6; and
the resources for the transmission of the HARQ signaling are in accordance with a DL-reference UL-DL configuration #2, #4, or #5.

8. A method for wireless communication by a base station, comprising:
generating first downlink control information (DCI) for scheduling resources in time in a system frame for transmission of one or more uplink (UL) data channels and hybrid automatic request (HARQ) signaling for acknowledging whether one or more downlink (DL) data channels have been successfully decoded, wherein:
the resources for transmission of the one or more UL data channels and the HARQ signaling are scheduled using a UL-to-DL resource ratio of a time-division duplex (TDD) subframe configuration for the system frame;
the first DCI comprises an UL index field;
the first DCI does not comprise a DL assignment index (DAI) field if the first DCI is transmitted in a common search space;
the first DCI comprises both the UL index field and the DAI field if the DCI is transmitted in a UE-specific search space; and
the HARQ signaling is generated by assuming that more than one DL data channels are not scheduled in multiple subframes associated with the subframe where the HARQ signaling takes place;
transmitting the first DCI to a user-equipment (UE); and
receiving the one or more UL data channels and the HARQ signaling using the scheduled resources and in accordance with the TDD subframe configuration.

9. The method of claim 8, wherein the TDD subframe configuration comprises a TDD-primary cell (PCell) UL-DL configuration, and wherein a subframe for transmission of one of the one or more UL data channels is determined based on the TDD-PCell UL-DL configuration and a subframe index identified by an UL grant scheduling the one of the one or more UL data channels.

10. The method of claim 8, wherein:
the UL index field indicates whether the one or more UL data channels are scheduled in at least two subframes; and
the DAI field indicates a quantity of the one or more DL data channels that the HARQ signaling is to acknowledge.

11. The method of claim 10, wherein:
the first DCI is received in a subframe of the system frame and schedules resources for at least one of the one or more DL data channels;
the method further comprises transmitting a second DCI in at least one following subframe of the system frame, the second DCI scheduling resources for at least another one of the one or more DL data channels; and
the DAI field indicates an accumulated quantity of the data channels in the subframe and the at least one following subframe.

12. The method of claim 10, where the HARQ signaling is generated by assuming that the one or more DL data channels are not scheduled in multiple subframes of the system frame.

13. The method of claim 8, wherein
the first DCI is received in a subframe of the system frame; and
the HARQ signaling is generated by multiplexing a HARQ-acknowledgment (ACK) indication for DL data in the subframe and one or more following subframes regardless of whether the UE detects one or more DCIs scheduling DL data in the one or more following subframes.

14. The method of claim 8, wherein:
the TDD subframe configuration comprises a TDD-PCell UL-DL configuration #0 or #6;
the resources for the transmission of the one or more UL data channels are in accordance with the TDD-PCell UL-DL configuration #0 or #6; and
the resources for the transmission of the HARQ signaling are in accordance with a DL-reference UL-DL configuration #2, #4, or #5.

15. An apparatus for wireless communication by a user-equipment (UE), comprising:
a memory; and
one or more processors coupled to the memory, the one or more processors and the memory being configured to:
receive first downlink control information (DCI) for scheduling resources in time in a system frame for transmission of one or more uplink (UL) data channels and hybrid automatic request (HARQ) signaling for acknowledging whether one or more downlink (DL) data channels have been successfully decoded, wherein:
the resources for transmission of the one or more UL data channels and the HARQ signaling are scheduled using a UL-to-DL resource ratio of a time-division duplex (TDD) subframe configuration for the system frame;
the first DCI comprises an UL index field;
the first DCI does not comprise a DL assignment index (DAI) field if the DCI is transmitted in a common search space; and the first DCI comprises both the UL index field and the DAI field if the DCI is transmitted in a UE-specific search space;
generate the one or more UL data channels and the HARQ signaling assuming that more than one DL data channels are not scheduled in multiple subframes associated with the subframe where the HARQ signaling takes place; and
transmit the one or more UL data channels and the HARQ signaling using the scheduled resources and in accordance with the TDD subframe configuration.

16. An apparatus for wireless communication by a base station, comprising:
a memory; and
one or more processors coupled to the memory, the one or more processors and the memory being configured to:
generate first downlink control information (DCI) for scheduling resources in time in a system frame for transmission of one or more uplink (UL) data channels and hybrid automatic request (HARQ) signaling for acknowledging whether one or more downlink (DL) data channels have been successfully decoded, wherein:
the resources for transmission of the one or more UL data channels and the HARQ signaling are scheduled using a UL-to-DL resource ratio of a time-division duplex (TDD) subframe configuration for the system frame;
the first DCI comprises an UL index field;
the first DCI does not comprise a DL assignment index (DAI) field if the first DCI is transmitted in a common search space;
the first DCI comprises both the UL index field and the DAI field if the DCI is transmitted in a UE-specific search space; and
the HARQ signaling is generated by assuming that more than one DL data channels are not scheduled in multiple subframes associated with the subframe where the HARQ signaling takes place;
transmit the DCI to a user-equipment (UE); and
receive the one or more UL data channels and the HARQ signaling using the scheduled resources and in accordance with the TDD subframe configuration.

17. A method for wireless communication by a user-equipment (UE), comprising:
receiving first downlink control information (DCI) for scheduling resources in time in a system frame for transmission of one or more uplink (UL) data channels and hybrid automatic request (HARQ) signaling for acknowledging whether one or more downlink (DL) data channels have been successfully decoded, wherein:
the resources for transmission of the one or more UL data channels and the HARQ signaling are scheduled using UL-to-DL resource ratio of a time-division duplex (TDD) subframe configuration for the system frame;
the first DCI comprises a DL assignment index (DAI) field;
the first DCI does not comprise a UL index field if the first DCI is transmitted in a common search space; and
the first DCI comprises both the UL index field and the DAI field if the first DCI is transmitted in a UE-specific search space;
generating the one or more UL data channels and the HARQ signaling; and
transmitting the one or more UL data channels and the HARQ signaling using the scheduled resources and in accordance with the TDD subframe configuration.

18. The method of claim 17, wherein the TDD subframe configuration comprises a TDD-primary cell (PCell) UL-DL configuration, the method further comprising determining a subframe for transmission of one of the one or more UL data channels based on the TDD-PCell UL-DL configuration and a subframe index identified by an UL grant scheduling the one of the one or more UL data channels.

19. The method of claim 17, wherein:
the UL index field indicates whether the one or more UL data channels are scheduled in at least two subframes; and
the DAI field indicates a quantity of the one or more DL data channels that the HARQ signaling is to acknowledge.

20. The method of claim 17, wherein the UE interprets a value of the UL index field according to a pre-configuration.

21. The method of claim 19, wherein:
the first DCI is received in a subframe of the system frame and schedules resources for at least one of the one or more DL data channels;
the method further comprises receiving a second DCI in at least one following subframe of the system frame, the second DCI scheduling resources for at least another one of the one or more DL data channels; and
the DAI field indicates an accumulated quantity of the data channels in the subframe and the at least one following subframe.

22. The method of claim 19, wherein generating the HARQ signaling comprises assuming that the one or more DL data channels are not scheduled in multiple subframes of the system frame.

23. The method of claim 17, wherein:
the first DCI is received in a subframe of the system frame; and
generating the HARQ signaling comprises multiplexing a HARQ-acknowledgment (ACK) indication for DL data in the subframe and one or more following subframes regardless of whether the UE detects one or more DCIs scheduling DL data in the one or more following subframes.

24. The method of claim 17, wherein:
the TDD subframe configuration comprises a TDD-PCell UL-DL configuration #0 or #6;
the resources for the transmission of the one or more UL data channels are in accordance with the TDD-PCell UL-DL configuration #0 or #6; and
the resources for the transmission of the HARQ signaling are in accordance with a DL-reference UL-DL configuration #2, #4, or #5.

25. A method for wireless communication by a base station, comprising:
generating first downlink control information (DCI) for scheduling resources in time in a system frame for transmission of one or more uplink (UL) data channels and hybrid automatic request (HARQ) signaling for acknowledging whether one or more downlink (DL) data channels have been successfully decoded, wherein:
the resources for transmission of the one or more UL data channels and the HARQ signaling are scheduled using a UL-to-DL resource ratio of a time-division duplex (TDD) subframe configuration for the system frame;

the first DCI comprises a DL assignment index (DAI) field;

the first DCI does not comprise a UL index field if the first DCI is transmitted in a common search space; and the first DCI comprises both the UL index field and the DAI field if the first DCI is transmitted in a UE-specific search space;

transmitting the first DCI to a user-equipment (UE); and receiving the one or more UL data channels and the HARQ signaling using the scheduled resources and in accordance with the TDD subframe configuration.

26. The method of claim 25, wherein the TDD subframe configuration comprises a TDD-primary cell (PCell) UL-DL configuration, and wherein a subframe for transmission of one of the one or more UL data channels is determined based on the TDD-PCell UL-DL configuration and a subframe index identified by an UL grant scheduling the one of the one or more UL data channels.

27. The method of claim 25, wherein:

the UL index field indicates whether the one or more UL data channels are scheduled in at least two subframes; and the DAI field indicates a quantity of the one or more DL data channels that the HARQ signaling is to acknowledge.

28. The method of claim 25, wherein a value of the UL index field is configured to be interpreted according to a pre-configuration.

* * * * *